(12) United States Patent
Kingdon et al.

(10) Patent No.: US 6,615,193 B1
(45) Date of Patent: *Sep. 2, 2003

(54) MONITORING SYSTEM AND METHOD

(75) Inventors: Jason Kingdon, London (GB); Tony James Wicks, London (GB); Annoop Singh Mangat, London (GB); Konrad Simeon Feldman, London (GB); John Christopher Taylor, London (GB)

(73) Assignee: Searchspace Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,290

(22) Filed: Apr. 22, 1998

(30) Foreign Application Priority Data

Apr. 22, 1997 (GB) ................................................ 9708064

(51) Int. Cl.[7] .............................................. G06F 17/60
(52) U.S. Cl. ........................... 705/65; 235/379; 705/39; 713/172
(58) Field of Search ................. 380/24, 23; 705/39–44, 705/64, 65; 379/143–145; 235/379, 380; 340/825.34; 713/172

(56) References Cited

U.S. PATENT DOCUMENTS

| 5,440,634 A | * | 8/1995 | Jones et al. ................... 380/24 |
| 5,757,913 A | * | 5/1998 | Bellare et al. ................ 380/23 |
| 5,878,138 A | * | 3/1999 | Yacobi ......................... 380/24 |
| 5,884,289 A | * | 3/1999 | Anderson et al. .............. 705/44 |
| 5,914,471 A | * | 6/1999 | Van De Pavert ............ 235/380 |
| 5,924,084 A | * | 7/1999 | De Rooij ...................... 705/39 |
| 5,930,363 A | * | 7/1999 | Stanford et al. .............. 380/24 |

FOREIGN PATENT DOCUMENTS

| GB | 2287565 | 9/1995 | ............. G07F/7/10 |
| WO | 9702547 | 1/1997 | ............. G07F/7/08 |

* cited by examiner

Primary Examiner—Thomas Mullen
(74) Attorney, Agent, or Firm—Fulbright & Jaworski L.L.P.

(57) ABSTRACT

This invention provides a system and method for electronic value payment in which a practical and secure means for auditing and accounting electronic value is achieved. The invention offers a means for identifying "blocks" of electronic value with single electronic tags. This facility makes the invention compact to implement and offers a practical way for tagging in circumstances where large amounts of electronic value, such as required for electronic representations of money, preclude the use of individual unit tagging. The invention combines block tagging with tag flow control mechanisms which allows block auditing and detection of counterfeit value. Independent tag (10) and value (12) representations make it possible to operationally change the tag associated with a block of value. The electronic value representations of the invention are readily applied to existing value exchange systems. The invention may be applied alongside existing value storage mechanisms, to enhance security, or as a replacement for them.

23 Claims, 3 Drawing Sheets

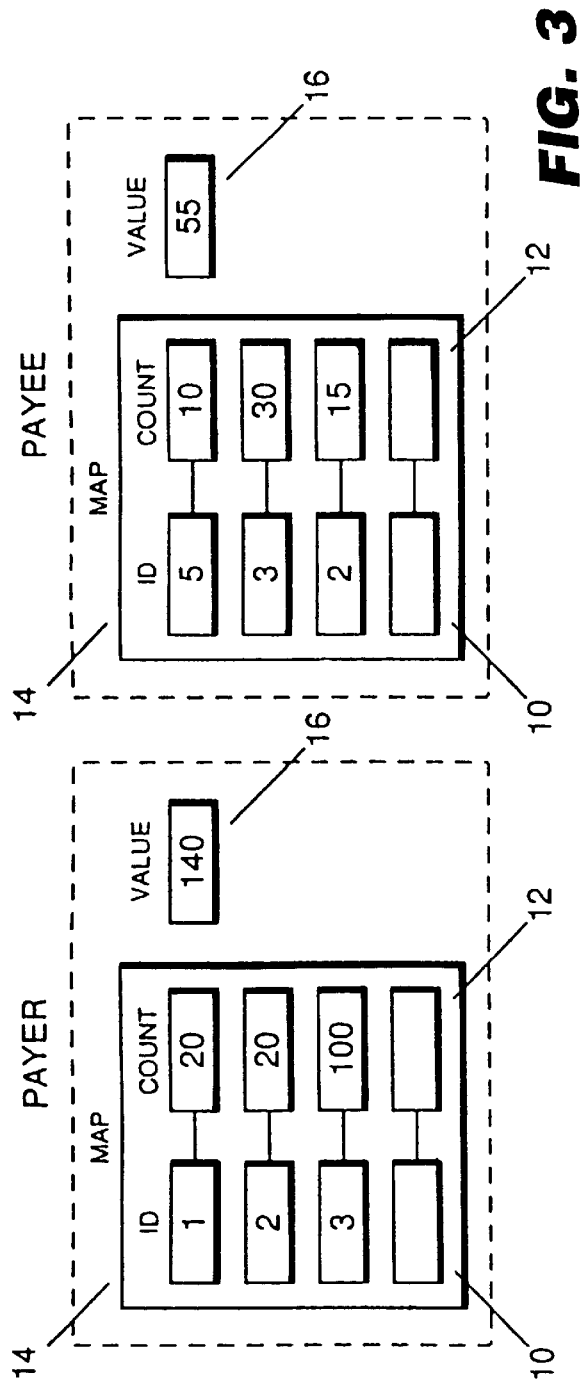
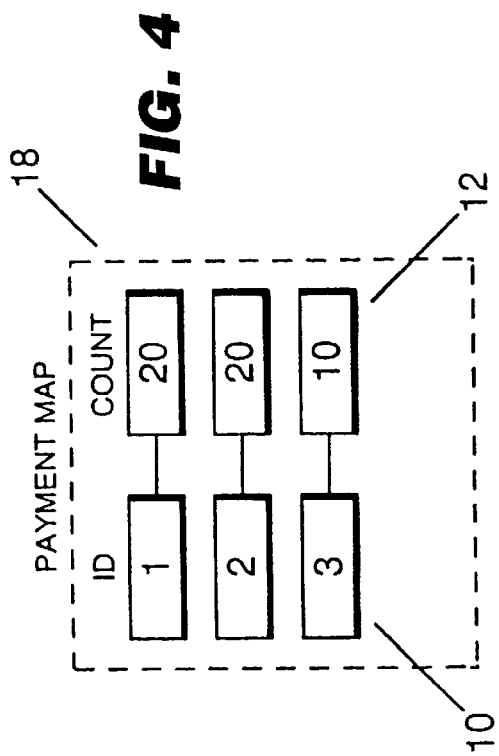

MONITORING SYSTEM AND METHOD

TECHNICAL FIELD OF THE INVENTION

The invention provides a method of electronic value payment that uses a "block" value tagging means that can be used for the detection of fraud in electronic value payment systems. Additionally, the invention applies tag flow control mechanisms to facilitate value auditing across complex operational hierarchies. The invention is practical to implement, flexible enough for use in numerous operational scenarios and independent of actual electronic value representation and encryption mechanisms that may be applied. The size of "blocks" of tagged value in the invention is arbitrary and different levels of granularity can be used.

BACKGROUND OF THE INVENTION

Any system that uses electronic representation of some associated value may be termed an electronic value system. Such systems circumvent the exchange of actual value in favour of the ease of storage and exchange of an electronic representation of that value. The plethora of current electronic value exchange systems can be characterized in two ways, those that are audited, and give rise to the issue of invoices authorising and recording payments, and those that are unaudited, in that they comprise immediate exchange of tokens which have some attributed value. This invention provides a means to detect fraud in electronic value exchange systems. It has primary application in unaudited systems but may also be used as an additional security means for systems that are audited.

Value reconciliation in an audited electronic value exchange system assumes issue of an explicit instruction, or invoice, that authorises value reimbursement between the centrally held accounts of the parties involved in the payment. This gives rise to a record of payment that builds an audit trail that can be traced in order to detect fraudulent value exchanges. Security is high but there is no anonymity and the auditing adds an additional cost to each transaction.

Electronic value payment methods that comprise the exchange of tokens, vouchers, or equivalent electronic money representations do not require an audit of each transaction. The transaction, or value exchange, process is essentially anonymous and no record is necessarily made of the identity of the payment parties, although receipts giving these details may be issued. The value exchange, from payer to payee, is made on the basis of mutual consent and no independent reference is made to either party in the transaction. The payment proceeds only on the basis that the payer has sufficient funds in terms of the number or value of tokens, and that the payee is willing to accept them. Implicit in this process, and that of other similar transaction methods, is trust. To participate in a transaction there must be a strong belief that the tokens exchanged are guaranteed by some third party, have some associated value and that every effort has been made to prevent counterfeiting and fraud.

It is known that there are fixed costs associated with the processes of auditing and value reconciliation. The auditing cost may represent only a small percentage of large value transactions but can make small value transactions uneconomic. The cost imbalances associated with low value transactions makes auditing comparatively expensive and inappropriate. Electronic value transaction systems that do not audit each transaction can therefore make considerable cost and efficiency savings and are therefore desirable. However, the lack of direct transaction auditing means that these systems must make additional safeguards to prevent the introduction of counterfeit value. Counterfeit prevention mechanisms must be practical, cost effective, add little or no overhead to the transaction process, be hidden from the user, allow detection of fraud at the earliest opportunity and ideally give some indication of the level of fraudulent value present in a system should a breach of security occur. Additionally, counterfeit prevention and fraud detection systems should maintain user anonymity.

Consider, for example, the use of telephone payment cards. These cards perform the fundamental task of value storage. They are purchased from a vendor and have a value associated with them that corresponds with the number of tokens that they contain. In use, at appropriately equipped telephone points, value is debited, or tokens are removed, from cards in exchange for telephone services. The telephone system operator has no means with which to identify the card user, other than through assumptions or inductive reasoning, and payments for services are therefore received anonymously. In order to reconcile card sales against phone usage, aggregate statistics of value debited from cards are accounted for by the telephone operators. However, a full system account is not usually possible since much value will always remain on cards in circulation that cannot be readily audited. Sizeable levels of fraudulent value may therefore remain hidden from scheme operators.

An area of growth for electronic value payment is that of "means of exchange" payment devices. Electronic payment schemes of this type aim to encompass the fundamental properties of traditional cash and will perhaps in future become a replacement for it. Technologies applied in this area allow secure electronic value storage, portability and person to person payment mechanisms. If electronic value systems of this type succeed in their goal of cash replacement then full transaction auditing not only becomes problematic, in terms of storage and cost of processing, but also undesirable if payment anonymity is to be maintained.

Checking mechanisms are applied in such schemes to verify the authenticity of cards and are applied to guarantee the integrity of value transfers to prevent fraud and the potential manufacture of value. Wired logic authentication and encryption response mechanisms are designed to limit the scope of fraud and identify valid cards from those that may have been tampered with or those that may be counterfeit. Public key encryption techniques are also used to verify the authenticity of both parties in a transaction, encrypt messages passed between them, and to prevent message snooping. Encryption schemes used in such exchanges rely on unique card identity mechanisms, transaction numbering or random number generation techniques to create unique encryption sequences that cannot simply be recorded and replayed in order to transfer falsified value between parties.

The growth of telecommunications and the internet offer huge potential for electronic value exchange systems. It is no longer necessary for the payer and the payee in a transaction to be physically located in the same place. Electronic transactions can be made across networks, between an individual and a remotely located point-of-sale device, or between two individuals in different locations. There is no longer the need for physical movement of value with it's inherent costs and security risks. However, the flexibility of these new electronic payment forms introduces new security risks for scheme operators. Transglobal electronic value usage increases the problems associated with system monitoring and provides great potential for rapid distribution, or laundering, of fraudulent value should its manufacture prove possible.

Throughout these types of systems there is a need for fraud detection mechanisms. The present invention provides the means for electronic value exchange system operators to detect fraud, provides means to assess the levels of fraudulent exposure that have occurred and allows additional information that may have relevance to security and scheme operation to be exchanged.

Stored electronic value systems use number or token representations to describe value. Typically a value representation will consist of a string of binary bits but may also consist of a set of uniquely stored tokens. Electronic payment devices (EPDs) that are capable of storing and exchanging electronic value can take a variety of forms. Actual value storage on an EPD is system or scheme dependent and may be implemented with methods that range from the simple to the highly complex. An EPD may store value using simple memory devices, flash memories, electronically erasable programmable read only memories (EEPROMS) or other technologies capable of retaining information for long periods. EPDs may also use more complex microprocessor and microcontroller technologies.

Electronic payment, or value exchange, between two EPDs requires the payer device to be debited by the payment value amount and then the payee device to be credited with that value. Where electronic value is stored in numerical form, debiting, or removal, of value is achieved by subtracting the payment amount from the electronic stored value representation. Crediting, or addition, of value is achieved by adding the payment value to the electronic stored value representation. In each case, security or operational safeguards are applied which place boundaries on the value of payments. Any EPD will have a finite storage capacity defining not only the upper limit of value that can be stored but also the minimum value that may be represented. EPDs may, for instance, use fractional representations of real value for use in micro-payment systems. In most cases the minimum amount of value on an EPD should never be allowed to go below zero and therefore the value of payment debited from a device should never exceed the amount of value stored on it. Similarly, the amount of value credited to an EPD should never cause it to exceed maximum numerical representation, or storage capacity, limits.

If electronic value is stored in the form of discrete tokens then payment consists of a transfer of the appropriate number of these tokens from payer to payee. The payer device removes the appropriate number of tokens from it's store and transfers them to the payee device for storage.

As well as differentiating payment and storage methods EPDs can be further characterized by their scope of operation. Broadly speaking, any EPD that has the ability to store and exchange electronic value can be considered to be one of two types, it is either a "store of value" or a "means of exchange" device.

"Store of value" EPDs are limited in that they may only make payments to specific point-of-sale devices. Many EPDs of this type are non-rechargeable and therefore disposable once all the value has been paid from them. Others may be re-credited, or recharged, with value but this may only be performed at specific, well controlled, outlets such as bank automated teller machines (ATMs). Electronic person-to-person payments with this type of EPD are not possible.

The scope of operation of "means of exchange" EPDs is wider. They are designed to offer greater flexibility and aim to operate in an equivalent role to traditional cash based exchange systems. This type of EPD may be both debited and credited with electronic value, they offer the facilities associated with "store of value" devices and additionally allow person-to-person electronic value exchanges to be made, although specialised interface equipment may be required to allow this operation to be performed.

Common to most electronic value exchange schemes are the processes of value creation, value distribution, value collection and value auditing. The process of value creation is usually limited to a small number of electronic value originators. Value creation may occur during the manufacture of an EPD, at the point where a software payment application is added to an EPD or through transfer of value from some specialised source. Security safeguards are used to prevent value creation by some non-authorised source and to limit the potential for fraudulent value generation. Once created, electronic value is issued to scheme participants, who buy quantities of value using traditional payment methods. The specific amount of value issued will be dependent on the liabilities of the electronic value issuer and the requirements of the electronic payment system. Value creation is usually performed by a bank, national body, similar large organization or the operator of specific point-of-sale devices. In future value creation may increasingly be performed by large retail outlets, such as supermarkets, operating "loyalty card" or equivalent systems.

Once the steps associated with the creation of electronic value have been completed the value is distributed to scheme participants. In the case of non-rechargeable EPDs, such as telephone card systems, distribution is performed through traditional retail channels. Electronic value systems of this type are limited in that value distribution is linked to the distribution of EPDs and there are no means by which distribution of each can be performed separately.

In schemes where EPDs can be both debited and re-credited, electronic value distribution is not tied to the distribution of the actual EPDs. Once there is an operating EPD population, these may be re-credited at bank ATMs, or similar outlets, or, in the case of "means of exchange" EPD systems, then additionally through person-to-person transactions. Mechanisms must exist for electronic value to traverse operational hierarchies and, for example, for the value to move from a small number of scheme operators who originate the value to banking, or other similar outlets, through to retailers and consumers. It is possible for a small number of scheme originators to source value to large numbers of electronic value users across modem telecommunication networks. The demands made by larger electronic value schemes are likely to require more complex operational hierarchies of inter-connected EPDs.

SUMMARY OF THE INVENTION

The present invention has application in systems where, in the course of normal operation, there are value flows that finally lead to value return to the scheme operators. Once any value has been returned it can be audited. In some schemes, such as telephone card systems, this may simply mean the return of aggregated electronic payment figures from point-of-sale devices.

More complex electronic value schemes, such as those using "means of exchange" EPDs, lead to systems and hierarchies that more readily model those of existing banking structures which operate cash based systems. Electronic value may be withdrawn by a user and passed onto retailers or other scheme users in exchange for goods or services. In turn the value may then be passed to other scheme users or returned back to banks and then to the scheme operators.

Electronic value returned to scheme operators can be fully audited. To detect fraud, scheme operators will balance electronic value issue with that of return and apply measures, such as random population sampling or value velocity flows, to estimate the amount of electronic value in circulation. However, accurate estimates of this kind are known to be problematic. At any point scheme operators will see only a fraction of the electronic value issued. Fraudulent value can easily remain hidden and is often extremely difficult to detect. This is especially true where the system is experiencing growth and where fraudulent value is injected into a system over extended periods. Early detection of fraud is of primary importance so that steps can be taken to find it's source and to limit its expansion.

In the light of the foregoing, a system according to the present invention involves applying tagging to discrete blocks of value. This value can travel through the electronic value exchange system and on return to the scheme operator, who has a record of the tag information and associated value, may be explicitly audited. Once a specific tagged value block has been accounted for then additional instances of value with the same tag indicates the immediate presence of fraud. The additional amount of value, above that which has been issued with a given tag, also gives some indication of the level of fraud in the system.

More specifically, the present invention provides a system for monitoring the flow of value through a population of users to detect fraud, comprising blocks of electronic value released from a source into the population of users, the blocks each having a predetermined identity tag and being divisible during use to sub-blocks with the same identity tag, such that eventual return of the electronic value to the source can be monitored by means of the identity tags and associated value to detect fraud in the system.

By using the tagging in this way, simplified value auditing of discrete amounts of electronic value can occur and detection of fraudulent value, should the value audited exceed that issued, will arise. Further, the tags can co-exist with the electronic value storage mechanisms of a given scheme, since they may be stored in a separate tag map.

The tag identities may include or be comprised of date and time information to allow systems to relate them easily to period of manufacture and release.

The tag map may comprise any number of tag registers consisting of an identity tag and value count.

The process of electronic value exchange is accompanied by tag information exchange, with the tag information exchanged providing a tag unit breakdown of the electronic value transacted. Tag information for an exchange is removed from the tag map of a payer device and added to the tag map of a payee device in a controlled way. Tag maps involved in an exchange may then be sorted to remove empty register spaces and to facilitate prioritised identity tag ordering. The flow of value in a system is therefore accompanied by a flow of tag information. The system is therefore robust in that it can operate in a multitude of scenarios.

In a particular embodiment each user has a plurality of registers for storing identity tags and associated value counts and a separate value register which stores the total value associated with the user. A separate value register is, however, not essential because the tag registers include the value counts which, when summed, give the total value associated with a user.

The blocks of electronic value are released in an order predetermined by a scheme operator, which order may be systematic or random. The registers of each user may be controlled to sort the resulting sub-blocks by reference to the identity tags. In a particular embodiment, the sub-blocks are sorted into their order of release. As a result there will be rapid movement through a population of users of the value associated with the tag information that has remained longest in the system.

A sort specifier, which causes the registers to be arranged by identity tag in a chosen order, may be passed between users during use of the system. Thus, if payments are always made from the register at the top of the stack of registers, preferential movement of the value associated with a particular identity tag can occur, thereby facilitating the removal of old tag value from the system, for example. Further, if the users exist in a hierarchy, the sort specifier may be passed from a user higher in the hierarchy to a user lower in the hierarchy before a transaction involving the electronic value occurs between the two users.

Preferably electronic value returned to the source can be reissued with a different identity tag.

Further, blocks of electronic value having different identity tags may originate from different sources. Thus, the system allows for a number of different suppliers of value to use the system.

Preferably, means are provided for monitoring the value associated with identity tags at chosen sites within the population of users. As a result, fraudulent value passing through the population of users can be more easily monitored. Also, value flow analysis can be more readily undertaken.

According to another aspect of the present invention there is provided a method of monitoring the flow of value through a population of users to detect fraud, comprising the steps of:

releasing blocks of electronic value from a source into a population of users, the blocks each being provided with a predetermined identity tag and being divisible during use into sub-blocks with the same identity tag, and monitoring the flow of the electronic value by reference to the identity tags and associated value such that fraud can be detected.

As will be appreciated, the invention has two combinations of use. Firstly it can be applied as an enhancement to other electronic value exchange systems to improve existing security. In this case, the tagging mechanism is used alongside the original electronic value representation and becomes part of the value exchange protocol, but does not represent the actual value exchanged. In this way the original, separate, representation of actual electronic value is exchanged and stored and may be referenced to further enhance security. The second application is for the block value tagging method to replace the electronic storage and value exchange processes of an electronic value exchange system. In this case the block value tagging is an actual representation of electronic value and it segments the electronic value stored.

A number of benefits arise from the invention's auditing capabilities; firstly it provides a secure means for detecting counterfeit electronic value; secondly the method of tagging provides a partition of value into blocks and therefore reduces the risk of attack associated with a larger single block of value; thirdly the tagging and value streams are handled separately making it possible to change operationally the tag associated with a block of value. This introduces a dynamic level of security in which tags can only be the target of counterfeit attack within a short time window. A further consequence of this is that transaction value flows and value flow patterns can be monitored. This in turn can enhance value measurement security systems and can provide the means for detecting audit trails and payment chains. Additionally, the detection of any tag identities not previously issued by scheme operators will immediately indicate the presence of fraud.

BRIEF DESCRIPTION OF THE DRAWINGS

The following description relates to exemplary embodiments of the present invention which are given by way of explanation and are in no way limiting, and refers to the accompanying drawings in which:

FIG. 3: shows states of payer and payee EPDs before an example payment of 50 units of electronic value;

FIG. 4: shows the tag payment map exchanged in the example payment; and

DETAILED DESCRIPTION OF THE INVENTION

Figure 1:
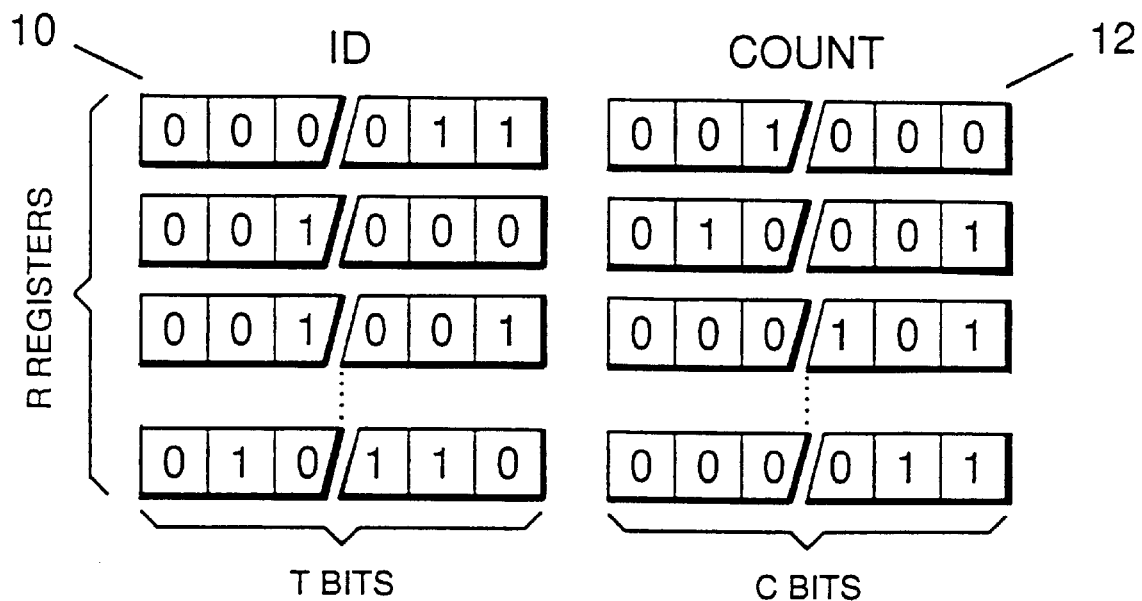
FIG. 1: shows a tag map comprising a number of tag registers.

In general, but not exclusive terms, the invention can be employed through the tagging system illustrated in FIG. 1. Each tag consists of two parts, a tag ID (identity) (10) and an associated tag count (12). The tag count consists of a binary string of C bits in length whilst the tag ID consists of a binary string of T bits in length. Alternate number representations could equally be applied for the tag count, with any symbol representation applied for the tag ID. The number of bits required for the tag count relates directly to the numeric range requirements of the electronic value representation. The number of bits required for the tag ID depends on the number of unique tags required in the electronic value system and is therefore an operational parameter of the invention. The combination of tag ID and tag count gives a tag register of C+T bits in length. A number, R, of such registers are required by the invention to facilitate tag transfer to be performed between EPDs exchanging electronic value in a system. These registers are termed the tag map (14). The actual number of tagging registers on an EPD will be dependent on the parameters of the electronic value scheme. Increased register numbers enhance the potential of the invention for very fine grain value auditing and offers other operational benefits.

Figure 2:
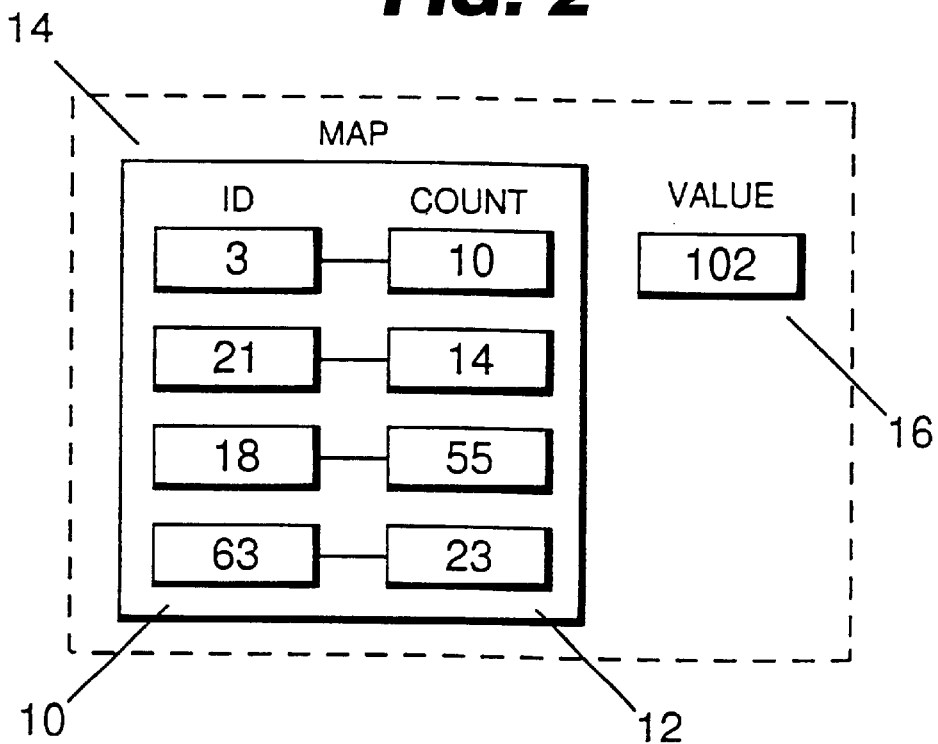
FIG. 2: shows a tagged electronic value representation.

Application of the invention to electronic value exchange schemes that already maintain a unique electronic value store is straightforward. For each electronic value store (16) on an EPD the invention associates a tag map (14). In the example in FIG. 2, four tag registers are used in the tag map of the EPD. The EPD is therefore capable of storing up to four unique tag groupings. Each tag register is either empty or contains a tag count associated with a unique tag ID not stored elsewhere in the tag map (14). Tag registers become empty when the tag count associated with a given tag ID is zero. The tag count indicates the number of electronic units that have been tagged to a specific tag ID. A summation of each of these counts gives a measure of the total electronic value stored on the EPD, while the tag IDs provide a subdivision of groupings of that value.

The ordering of tag registers in the tag map determines the order in which they are used during payment. Mechanisms are applied to the ordering process to control the flow of tag information in a system. In general but not exclusive terms, tag information is taken sequentially from top to bottom of the tag map. Other ordering schemes, such as by algorithmic navigation of the registers as they are read, are possible and have equal practical application.

Electronic value exchange proceeds in the normal way but is accompanied by a tag payment map (18) transfer. The tag payment map (18) that is passed consists of any number of tag registers, up to the maximum number of tag registers found on the payer device. The content that is passed is dependent on the tagging information present on the payer device and the amount of value transacted. The tag payment map (18) is constructed from the contents of the tag map (14). Tag counts, and associated tag IDs, are taken from the map (14) until each unit of electronic value exchanged has an equivalent tag count, and tag ID, representation. If the tag count of the first register is insufficient to represent the total value being transacted then additional tag counts are removed sequentially from each remaining tag register until a complete representation has been built. Once constructed the tag payment map (18) is passed, with the electronic value payment message, to the payee EPD. The payee device then adds the electronic value to it's internal store (16) in the normal way and also adds the tag payment map (18) to it's own tag map (14). The tag IDs are matched between the payment tag map (18) and the payee devices tag map (14). The tag counts (12) that are transferred are added to those already present in the destination tag map that have the same tag ID. Any tag IDs not already present on the device are allocated empty registers in the tag map (14). At any point after a payment has been made the payer EPD may sort it's tag map (14). This is done to remove empty registers from the map and in accordance with sorting mechanisms that may be in place to control the flow of tagging information.

Figure 5:
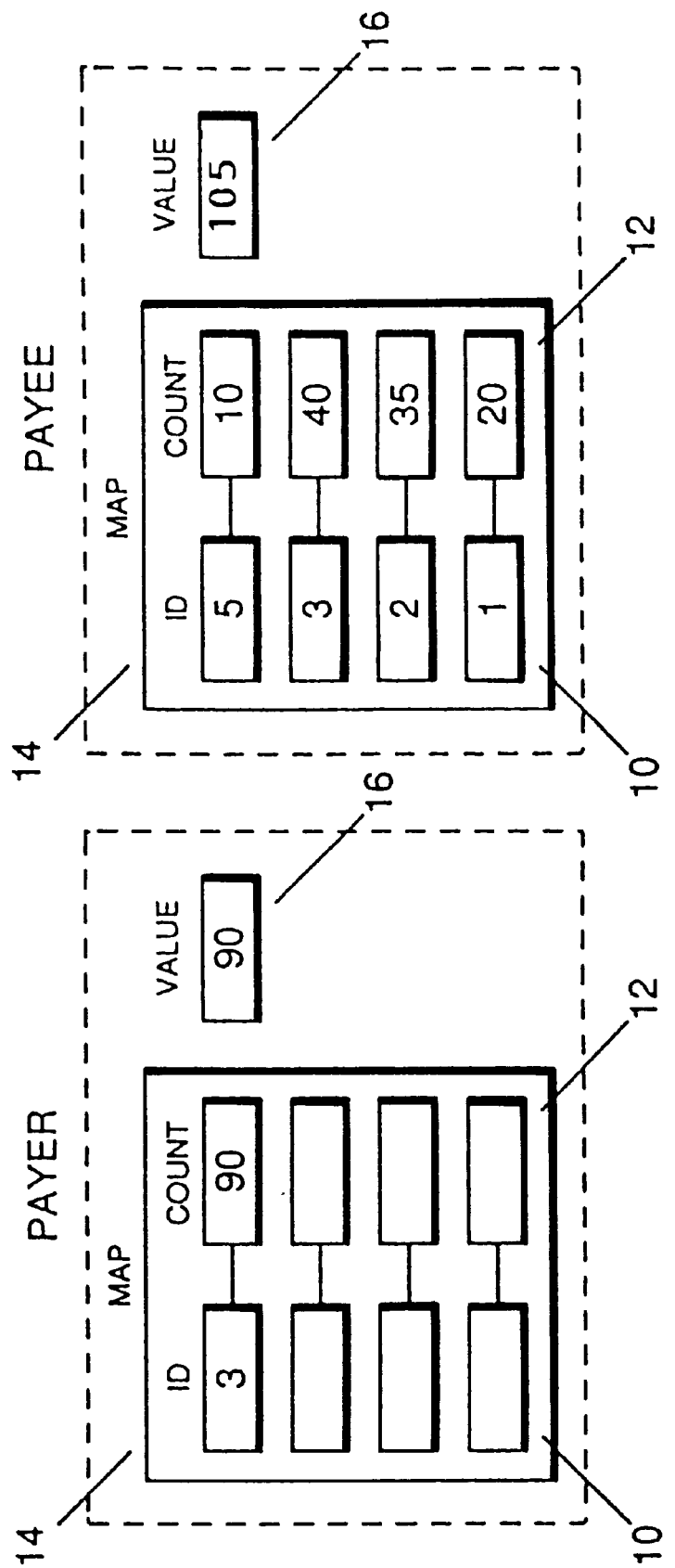
FIG. 5: shows states of payer and payee EPDs after an example payment of 50 units of electronic value.

The payment process is illustrated in FIGS. 3 to 5. In this example the payer EPD, shown in FIG. 3, contains 140 units of electronic value represented in the tag map as 20 units of tag ID 1, 20 units of tag ID 2 and 100 units of tag ID 3. The payee EPD, shown in FIG. 3, contains 55 units of electronic value represented in the tag map as 10 units of tag ID 5, 30 units of tag ID 3 and 15 units of tag ID 2. A payment of 50 units from the payer EPD to the payee is passed with the payment map (18), shown in FIG. 4. This map is constructed by debiting the first, then the second, then the third tag register in the payer EPD's map until the total payment unit value is represented. The electronic value payment of 50 units is represented in the tag payment map (18), shown in FIG. 4, as 20 units of tag ID 1, 20 units of tag ID 2 and 10 units of tag ID 3. At the point of payment this tag payment map (18) is added to the tag map (14) of the payee EPD. Tag ID 1 is not originally represented in the tag map (14) of the payee EPD and is therefore added into the first available register space, in this case the fourth register. Since tag IDs 2 and 3 are already represented, the tag counts of these are added to their respective tag map entries. Following the actual payment, the payer and payee EPDs then sort their tag maps. In this example the payer device therefore removes the empty tag registers, that previously contained tagging information relating to tag IDs 1 and 2, and moves remaining tag registers to the top of the tag map (14).

The issue of multiple tag IDs introduces the possibility that a payment may fail because there is insufficient space for additional tag IDs (10) to be placed in the tag map (14) of the payee EPDI. If the number of tag IDs present in any system is never greater than the minimum size of the tag map (14) on any EPD in that system then tag payment map incompatibilities can be avoided completely. Once a scheme operator has accounted for all value associated with a given tag ID (10) then that value may be re-released as is or given a new tag ID prior to release. In this way a scheme operator can release multiple tag IDs over a period of time but with a limited number only ever in circulation at one time. Careful management can also be used to control the number of tag IDs in circulation in order to increase the level of value segmentation for the purposes of auditing.

Since the tag map (14) provides a representation of the value held on an EPD, the invention may be used in systems to obviate the need for an independent electronic value store (16). However, continued operation of an independent electronic value store (16) as well as a tag map (14) has the advantage that the additional value representation can be used to verify correct value transfer and increase the difficulties involved in fraudulent value generation. Additionally, since the tag counts (12) are not actual representations of value, improper modification of the tag map (14) can not in itself lead to generation of value and therefore no additional security layer is necessarily required to guarantee the integrity of the tagging information.

In "store of value" systems, where payments can be made only to specific point-of-sale devices, the number of tag IDs (10) in circulation at any one time is a function of the tag map storage capacity at the point of sale, and the rate that value is audited at this point. Each EPD operating in such a system may only be capable of storing a small number of tag IDs, but the total number of tag IDs in use across all devices in the system may be very high. Efficient value segmentation is therefore possible, allowing accurate auditing and exposure risk analysis to be performed.

Application of the invention to more complex electronic value flow systems requires use of a secondary element of it which is to apply mechanisms to control the flow of tagging information in the system. The aim of such mechanisms is to encourage rapid return of old tag IDs and slower return of newer tag IDs. In this way the audit rate of electronic value released into a system is increased and this in turn increases the security benefits that this auditing process represents. In addition, tag payment preference mechanisms are introduced to control the flow of tag information across electronic payment hierarchies. These methods are most applicable to "means of exchange" electronic payment systems.

Consider an electronic exchange system where a scheme operator supplies individual banks with electronic value and in turn these banks supply consumers and retailers with value. Payments down the hierarchy should introduce new tag information into the operational population of scheme users. Payments up the hierarchy should remove old tag information from that population in order to perform auditing and value reconciliation. Two extensions of the invention are detailed that can perform these functions.

The first flow control system for use with the present invention assumes incremental or sequential release of tag IDs. This allows fixed sorting of tag registers in a tag map (14) to be performed on an EPD. Since the tag IDs provide information relating to the order in which they were released, sorting by an EPD leads to the earliest tag registers being placed at the top and the most recently released tag IDs sorted to the bottom of the tag map. EPDs are therefore predisposed to making payments with older tag IDs. In this way older tag IDs will flow faster through the value exchange system.

The representation of the tag ID places operational limits on the number of tag IDs that can be released. At some operational stage it will become necessary to re-issue tag IDs.

The second, alternative, flow control system for use with the present invention assumes use of an additional tag map (14) sort specifier. This specifier controls the ordering of the tag map (14). Whenever sorting of the tag map is performed, the presence of a tag register with the same tag ID as the sort specifier forces that register to be sorted to the bottom of the map. In this way the flow of tag information associated with a sort specifier can be controlled. Mechanisms must exist for the transmission of sort specifier information through the value flow system to allow the scheme operators to update the EPDs of scheme users. Prior to any payment between EPDs at different points in an operational hierarchy the more senior device communicates it's sort specifier to the device that it is making a payment with. This device then updates it's sort specifier and sorts it's tag map. This assumes that methods exist that identify the position of a device in the operational hierarchy.

So that tag information can more easily traverse an operational hierarchy, modified payment methods are adopted dependent on the position of an EPD in the hierarchy. This assumes that methods exist that identify the position of a device in the operational hierarchy. Payments up the hierarchy are made by taking tag information preferentially from the top of the tag map of the payer device. In this way old tag information can be passed to the top of the hierarchy. Payments down the hierarchy are made by taking tag information preferentially from the bottom of the tag map of the payer device. In this way recent tag information is passed down through the operational hierarchy. Payments between devices at the same level in the hierarchy are performed by taking tag information preferentially from the top of the tag map of the payer device. This encourages rapid flow of older tag information in the operational population of EPDs. Payments between EPDs at the same operational level in the upper parts of the operational hierarchy, such as at the bank level and above, should not be permitted, or be minimised or implemented in fixed ways, to limit miscellaneous tag information flow.

It will of course be understood that the present invention has been described above purely by way of example, and that modifications of detail can be made within the scope of the invention.

What is claimed is:

1. A system for monitoring the flow of value through a population of users to detect fraud, comprising
   means for assigning blocks of electronic value to users, the blocks each having a predetermined identity tag and being divisible into sub-blocks, each sub-block having the same predetermined identity tag; and
   means for monitoring identity tags used in transactions and for detecting fraudulent transactions by associating said identity tags used in transactions with said predetermined identity tags.

2. A system as claimed in claim 1, wherein the electronic value is stored in registers, each register storing an identity tag and a value count.

3. A system as claimed in claim 2, wherein each user has a plurality of registers for storing identity tags and associated value counts and a separate value register which stores the total value associated with the user.

4. A system as claimed in claim 3, wherein the blocks of electronic value are released in a predetermined order and the registers of each user are controlled to sort the resulting sub-blocks by reference to the identity tags.

5. A system as claimed in claim 4, wherein the sub-blocks are sorted into their order of release.

6. A system as claimed in claim 5, wherein a sort specifier is passed between users during use of the system.

7. A system as claimed in claim 6, wherein the users exist in a hierarchy and the sort specifier is passed from a user higher in the hierarchy to a user lower in the hierarchy before a transaction involving the electronic value occurs between the two users.

8. A system as claimed in claim 4, wherein a sort specifier is passed between users during use of the system.

9. A system as claimed in claim 8, wherein the users exist in a hierarchy and the sort specifier is passed from a user higher in the hierarchy to a user lower in the hierarchy before a transaction involving the electronic value occurs between the two users.

10. A system as claimed in claim 2, wherein the users exist in a hierarchy in which payments made down the hierarchy involve value associated with new identity tags and payments made up the hierarchy involve value associated with older identity tags.

11. A system as claimed in claim 1, wherein electronic value returned to the source can be reissued with a different identity tag.

12. A system as claimed in claim 1, wherein blocks of electronic value having different identity tags can originate from different sources.

13. A system as claimed in claim 1, wherein means are provided for monitoring the value associated with identity tags at chosen sites within the population of users.

14. A system as claimed in claim 1, wherein an identity tag associated with a block of electronic value includes time and date information.

15. A method of monitoring the flow of value through a population of users to detect fraud, comprising the steps of:

assigning blocks of electronic value from a source to a plurality of users, the blocks each being provided with a predetermined identity tag and being divisible during use into sub-blocks with the same identity tag, and monitoring the use of the electronic value by reference to the identity tags.

16. A system for detecting fraud in electronic financial transactions comprising:

means for assigning a predetermined identity tag to a discrete block of value, wherein said block of value represents a discrete financial amount and wherein said block of value may be divided into sub-blocks of value, each sub-block having said predetermined identity tag and an aggregate of the value of said sub-blocks equaling the value of said block of value; and means for detecting fraud in said financial transactions by correlating blocks of value and sub-blocks of value that are used in said transactions to said blocks of value assigned by said assigning means.

17. A method for detecting fraud in financial transactions by monitoring one or more discrete amounts of value that are involved in said transactions, comprising:

adding said discrete amounts of value to a user account, wherein said discrete value amounts are represented electronically and have a unique identity tag, the discrete value amounts capable of being divided into a plurality of smaller discrete value amounts; and dividing said discrete value amount into said plurality of smaller discrete value amounts during said transactions, wherein one or more of said plurality of smaller discrete value amounts are transferred from said user account to one or more other accounts, said smaller discrete value amounts having the assigned unique identity tag, and wherein a sum of said smaller discrete value amounts equals said discrete value amount.

18. The method of claim 17 further comprising:

monitoring said one or more of said smaller discrete value amounts that are transferred from said user account; and calculating a sum of said transferred smaller discrete value amounts.

19. The method of claim 17 wherein said discrete value amounts may have more than one unique identity tag and further comprising:

sorting said discrete value amounts.

20. The method of claim 19 wherein said discrete value amounts are sorted by said unique identity tag.

21. The method of claim 19 wherein said discrete value amounts are sorted by a relative size of said amounts.

22. The method of claim 17 wherein said discrete value amounts also have a release date tag and comprising:

sorting said discrete value amounts by a release date.

23. A method of monitoring financial transactions, wherein said transactions are associated with an exchange of value that is represented in electronic form, comprising:

assigning a unique identity tag to a block of value, said block representing a discrete financial amount and being divisible into a plurality of sub-blocks, each sub-block having said unique identity tag and a sub-block value, wherein a sum of said sub-block values equals said discrete financial amount; and dividing said block of value into said sub-blocks during a financial transaction; and transferring said sub-block of value from a first account to a second account to complete said financial transaction.

* * * * *

UNITED STATES PATENT AND TRADEMARK OFFICE
CERTIFICATE OF CORRECTION

PATENT NO. : 6,615,193 B1
DATED : September 2, 2003
INVENTOR(S) : Jason Kingdon

It is certified that error appears in the above-identified patent and that said Letters Patent is hereby corrected as shown below:

<u>Column 8,</u>
Line 65, "EPDI" should read -- EPD --.

<u>Column 11,</u>
Line 6, "claim 4" should read -- claim 5 --.

Signed and Sealed this

Twenty-seventh Day of January, 2004

JON W. DUDAS
*Acting Director of the United States Patent and Trademark Office*